United States Patent
Crickmore et al.

(10) Patent No.: US 8,537,345 B2
(45) Date of Patent: Sep. 17, 2013

(54) PHASE BASED SENSING

(75) Inventors: Roger Ian Crickmore, Dorset (GB); David John Hill, Dorset (GB)

(73) Assignee: Optasense Holdings Limited (GB)

( * ) Notice: Subject to any disclaimer, the term of this patent is extended or adjusted under 35 U.S.C. 154(b) by 0 days.

(21) Appl. No.: 13/499,076

(22) PCT Filed: Sep. 24, 2010

(86) PCT No.: PCT/GB2010/001802
§ 371 (c)(1),
(2), (4) Date: Mar. 29, 2012

(87) PCT Pub. No.: WO2011/039501
PCT Pub. Date: Apr. 7, 2011

(65) Prior Publication Data
US 2012/0188533 A1    Jul. 26, 2012

(30) Foreign Application Priority Data
Sep. 30, 2009  (GB) .................................. 0917150.5

(51) Int. Cl.
*G01N 21/00* (2006.01)
(52) U.S. Cl.
USPC ........................................................ 356/73.1
(58) Field of Classification Search
USPC ........................................................ 356/73.1
See application file for complete search history.

(56) References Cited

U.S. PATENT DOCUMENTS

| | | | |
|---|---|---|---|
| 4,121,155 A | 10/1978 | Chamuel | |
| 4,231,260 A | 11/1980 | Chamuel | |
| 4,649,529 A | 3/1987 | Avicola | |
| 4,697,926 A | 10/1987 | Youngquist et al. | |
| 4,699,513 A | 10/1987 | Brooks et al. | |
| 4,770,535 A | 9/1988 | Kim et al. | |
| 4,848,906 A | 7/1989 | Layton | |
| 4,885,462 A | 12/1989 | Dakin | |
| 4,947,037 A | 8/1990 | Nash et al. | |
| 5,140,154 A | 8/1992 | Yurek et al. | |
| 5,412,474 A | 5/1995 | Reasenberg et al. | |
| 5,680,489 A | 10/1997 | Kersey | |
| 5,787,053 A | 7/1998 | Ames et al. | |
| 6,449,046 B1 | 9/2002 | Huang et al. | |
| 6,466,706 B1 | 10/2002 | Go et al. | |
| 6,522,797 B1 | 2/2003 | Siems et al. | |
| 6,591,025 B1 | 7/2003 | Siems et al. | |

(Continued)

FOREIGN PATENT DOCUMENTS

| GB | 2 442 745 | 4/2008 |
|---|---|---|
| WO | WO 87/06690 | 11/1987 |

(Continued)

*Primary Examiner* — Tu Nguyen
(74) *Attorney, Agent, or Firm* — McDonnell Boehnen Hulbert & Berghoff LLP

(57) ABSTRACT

A method of distributed acoustic sensing (DAS) whereby the derivative or rate of change of a signal backscattered from a fiber is measured. The change, or derivative of the phase measured in this way has a much smaller amplitude than the signal itself if the difference between the two times at which the signal is measured is much less than the period of the signal being measured, resulting in lower sensitivity. Frequency shifts can be applied to temporally displaced return signals to compare the rate of change, for example by employing an output interferometer arranged to modulate the signal in each arm by a different frequency shift.

17 Claims, 2 Drawing Sheets

(56) References Cited

U.S. PATENT DOCUMENTS

| | | |
|---|---|---|
| 6,785,004 B2 | 8/2004 | Kersey et al. |
| 7,072,566 B2 | 7/2006 | Seo et al. |
| 7,119,325 B2 | 10/2006 | Pieterse et al. |
| 7,424,191 B2 * | 9/2008 | Tadakuma et al. ............ 385/122 |
| 7,869,014 B2 * | 1/2011 | Tadakuma et al. ........... 356/73.1 |
| 2005/0078316 A1 | 4/2005 | Ronnekleiv et al. |
| 2007/0024857 A1 | 2/2007 | Menezo |
| 2007/0041020 A1 | 2/2007 | Hall |
| 2007/0097376 A1 | 5/2007 | Courville et al. |
| 2007/0097377 A1 | 5/2007 | Courvielle et al. |
| 2008/0277568 A1 | 11/2008 | Crickmore et al. |
| 2008/0291461 A1 | 11/2008 | Waagaard et al. |
| 2011/0149295 A1 | 6/2011 | Crickmore et al. |

FOREIGN PATENT DOCUMENTS

| | | |
|---|---|---|
| WO | WO 00/12977 | 3/2000 |
| WO | WO 2006/048647 | 5/2006 |
| WO | WO 2007/021287 | 2/2007 |
| WO | WO 2008/110780 | 9/2008 |
| WO | WO 2010/004249 | 1/2010 |

* cited by examiner

PHASE BASED SENSING

FIELD OF THE INVENTION

The present invention relates to fibre optic sensing, and in particular to distributed acoustic sensing (DAS).

BACKGROUND OF THE INVENTION

Distributed acoustic sensing (DAS) offers an alternative form of fibre optic sensing to point sensors, whereby a single length of longitudinal fibre is optically interrogated, usually by one or more input pulses, to provide substantially continuous sensing of acoustic/vibrational activity along its length. The single length of fibre is typically single mode fibre, and is preferably free of any mirrors, reflectors, gratings, or change of optical properties along its length.

In distributed acoustic sensing, Rayleigh backscattering is normally used. Due to random inhomogeneities in standard optic fibres, a small amount of light from a pulse injected into a fibre is reflected back from every location along the length of the fibre, resulting in a continuous return signal in response to a single input pulse. By analysing the radiation backscattered within the fibre, the fibre can effectively be divided into a plurality of discrete sensing portions arranged longitudinally along the fibre which may be (but do not have to be) contiguous.

If a disturbance occurs along the fibre it changes the backscattered light at that point. This change can be detected at a receiver and from it the source disturbance signal can be estimated. Low noise levels and high discrimination can be obtained using a coherent optical time domain reflectometer (C-OTDR) approach as described above.

An alternative approach to DAS is based on heterodyne interferometry. In this approach light which has passed through a given section of fibre is interfered with light that has not. Any disturbance to this section of fibre causes a phase change between the two portions of light that interfere and this phase change can be measured to give a more accurate estimate of the disturbing signal than is possible with C-OTDR. The dynamic range for such a system is limited especially when sensing very long fibres and it is often desirable to use some method to increase dynamic range.

A variety of different techniques have been proposed to meet this aim. One particularly suitable example is the derivative sensing technique (DST) as set out in Applicant's co-pending WO2008/110780 to which reference is directed. This document describes a known sensor package of the type having four fibre optic sensor coils arranged between five fibre coupled mirrors. Interrogation of the sensor package is by the introduction of a pair of optical pulses, and the coils and pulses are arranged such that a series of pulses is returned, information from each sensor coil being derivable from the phase imposed on respective pulses. WO2008/110780 notes that if the change, or derivative of the phase is measured instead then this has a much smaller amplitude than the signal itself if the difference between the two times at which the signal is measured is much less than the period of the signal being measured. A system and method are then proposed which manipulates the timing of the pulses returned from the package such that they alternately contain direct or 'normal' phase information and derivative phase. FIG. 6 of WO2008/110780 is reproduced in the accompanying FIG. 4, and shows the combination of returned pulse trains 604 and 606 containing derivative information (at time 614 for example), interleaved temporally with the combination of returned pulse trains 602 and 608 which contain direct phase information (at time 612 for example).

SUMMARY OF THE INVENTION

It is an object of the present invention to provide improved methods and apparatus for providing distributed acoustic sensing.

According to a first aspect of the invention there is provided a method of distributed acoustic sensing (DAS) by interrogating a length of optic fibre, said optic fibre providing a change in phase of signal propagation in response to a sensed parameter, said method comprising: introducing an input signal into a length of optic fibre; receiving a return signal backscattered from said optical fibre in response to said input signal; comparing a first return signal backscattered from a portion of said fibre at a first time, and a second return signal backscattered from the same portion of said fibre at a second, different time; and deriving from said comparison a measure of the rate of change of phase with time of said backscattered signal.

In a particularly preferred embodiment, the first return signal is frequency shifted relative to said second return signal.

In this way, the derivative sensing technique (DST) can be applied to distributed acoustic sensing (DAS), despite the fact that DAS provides a substantially continuous return signal. This is in contrast to the pulsed returns provided by arrays of point sensors, which naturally allow for normal and derivative outputs to be interleaved.

DAS provides the advantage that an unmodified, substantially continuous length of standard fibre (e.g. SMF28) can be used, requiring little or no modification or preparation for use. Preferably Rayleigh backscattered signals are detected and analysed. One example of a distributed acoustic sensing arrangement operates with a longitudinal fibre up to 40 km in length, and is able to resolve sensed data into multiple channels corresponding to 10 m lengths. A suitable DAS system is described in GB 2442745 for example.

Since the fibre has no discontinuities, the length and arrangement of fibre sections corresponding to each channel is determined by the interrogation of the fibre. These can be selected according to the physical arrangement of the fibre and the structure or space it is monitoring, and also according to the type of monitoring required. In this way, the distance along the fibre, and the length of each fibre section, or channel resolution, can easily be varied with adjustments to the interrogator changing the input pulse width, pulse separation and input pulse duty cycle, without any changes to the fibre.

The frequency shift imposed between the first and second return signals can be effected by a shift applied to one or other of the return signals, eg by using an AOM. In such a case, a minimum frequency shift of approximately 40 MHz would be expected. In a preferred embodiment, the first return signal is modulated by a first frequency shift, and the second return signal is modulated by a second frequency shift. This allows smaller differences to be realised and greater flexibility in the choice of frequencies used. A convenient way of performing this is by passing received return signals through an output interferometer, said output interferometer arranged to modulate the signal in each arm by a different frequency shift. Michelson or Mach-Zehnder type interferometers could be used.

The signal input to the fibre under test comprises a pair of temporally spaced pulses in certain embodiments. These pulses will typically have different frequency shifts and heterodyne interferometry can be used in the analysis of backscattered signals. The frequency shift(s) applied to the first and second return signals, and the frequency shifts on the input pulses are desirably selected to allow simple isolation of the desired output components, i.e. the various carrier frequencies as explained below. Alternatively or additionally, the wavelength of the input pulses can be manipulated to allow further control over output components, as described in the examples below.

The first and second return signal are separated by approximately 125 ns in one embodiment, however this may be varied to suit the application, separations of less than 500 ns, or less than 250 ns or 100 ns may be desirable in different embodiments.

In embodiments the method further includes comparing a first return signal backscattered from a first portion of said fibre at a first time, and a second return signal backscattered from a second different portion of said fibre at substantially the same time; and deriving from said comparison a measure of phase of said backscattered signal. This provides for a 'normal' measure of phase, and hence the 'direct' acoustic signal. It is advantageous for the measure of phase and the measure of rate of change of phase to be determined substantially simultaneously in response to a common input signal. Embodiments demonstrating this feature can be exploited in methods of providing multiple sensitivity outputs, as described in PCT application Number GB2009/001480, published as WO2010/004249.

A further aspect of the invention provides a distributed acoustic sensing (DAS) system for interrogating a length of optic fibre, said optic fibre providing a change in phase of signal propagation in response to a sensed parameter, said system comprising: a receiver for receiving a signal backscattered from said optic fibre in response to an input signal; an output interferometer adapted to combine a first received signal backscattered from a portion of said fibre at a first time, and a second received signal backscattered from the same portion of said fibre at a second, different time, wherein said output interferometer includes a frequency modulator on at least one arm to impose a frequency difference between said first and second return signals; and a phase detector for receiving said combined signals and determining the rate of change of phase with time of said backscattered signal.

This system optionally includes a light source for providing an input signal to a fibre under test.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
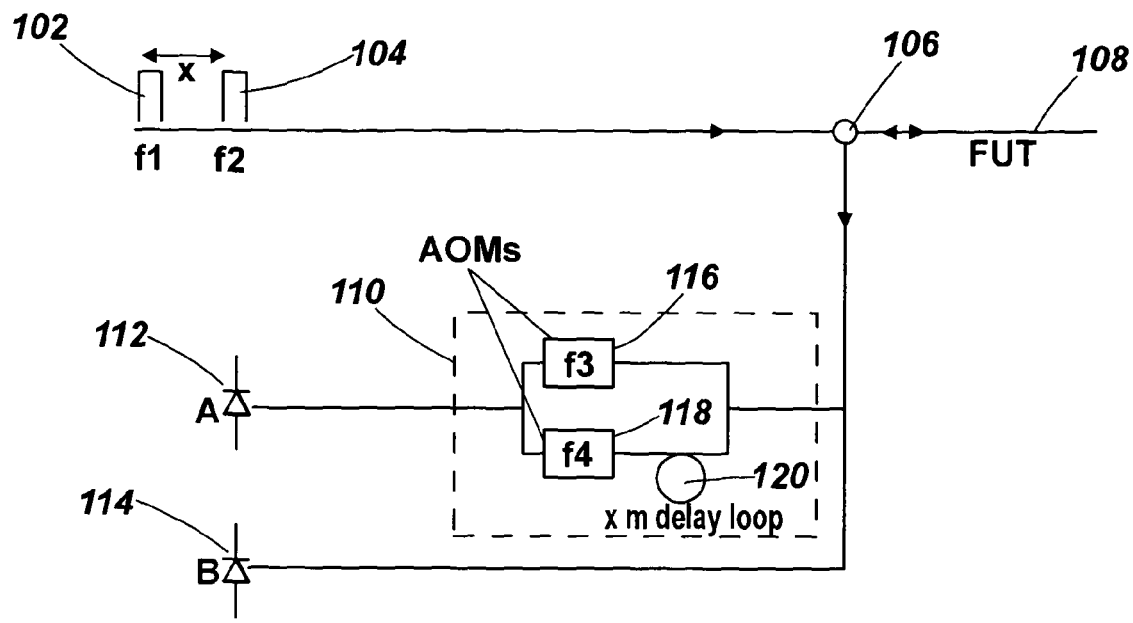
FIG. 1 shows a first embodiment of the present invention

With reference to FIG. 1, two optical pulses 102 and 104 are generated with frequency shifts of f1 and f2 and a separation between their starts of x meters. These pulses comprise an input signal which is propagated through a circulator 106 into the fibre under test (FUT) 108, which as explained may be a length of unmodified single mode fibre. Light which is backscattered in response to the input pulses passes back through the circulator and then the output interferometer 110 before reaching photodetector 112. In preferred embodiments the interferometer and photodetector are adapted to operate on Rayleigh backscattered signals. The output interferometer has acousto-optic modulators (AOMs) 116 and 118 in each arm which run continuously applying frequency shifts of f3 and f4 Hz respectively. One arm also has a delay coil 120 to impose a delay equal to the pulse separation, i.e. of length x meters.

Starting from the positions shown in FIG. 1 it can be seen that travelling to and from the circulator, light from f2 pulse 104 that passes through the delay arm of the output interferometer travels the same distance as light from f1 pulse 102 which passes through the shorter arm of the interferometer. Thus if light from these pulses arrive at the photodetector at the same time they must have been reflected from the same section of fibre, but at different times and so they generate a derivative signal. That is, as they have followed the same optical path the phase difference between them is just the change in the optical path length during the time separation between the two pulses. The frequency shifts of these two pulses is f2+f4 and f1+f3 and so they mix to form a carrier signal of frequency $$C1=(f2-f1)+(f4-f3).$$

Light from the f2 pulse that passes through the shorter arm of the interferometer must travel an extra 2x m (i.e. x m double pass) in the fibre under test in order to arrive at the photodetector at the same time as light from pulse f1 that has been through the delay arm. This will produce a normal signal (i.e. not a derivative) which corresponds to x meters of the FUT. The pulses that generate this normal signal have frequencies of f2+f3 and f1+f4 which mix to give a carrier signal of frequency $$C2=(f2-f1)+(f3-f4).$$

The other carrier frequencies that are generated result from both pulses going through the same arm of the interferometer $$C3=f2-f1,$$

or the same pulse going through both arms of the interferometer giving $$C4=f3-f4.$$

Through appropriate selection of f1-4 we can ensure that C1-4 are all different and it is possible to separate each carrier signal. For example if
f1=0 MHz, f2=10 MHz, f3=20 MHz and f4=50 MHz then C1=40 MHz, C2=20 MHz, C3=10 MHz and C4=30 MHz, note in all cases the frequency is shown as being positive. It should be noted the frequencies shown for pulses f1-f4 are all relative to an arbitrary reference and so can have a zero or negative value as well as a positive one.

The carrier that has the normal signal with the highest spatial resolution is C3 and results from pulses reflecting from sections of the fibre separated by x/2 m. However this output from the interferometer consists of two versions of this signal (corresponding to delayed and undelayed interferometer arms) from sections of fibre x/2 m apart, superimposed on top of each other. This problem could be avoided if, as shown in FIG. 1, the output fibre is split and one branch goes to photodetector 114 which will just see a single carrier (C3) with this high spatial resolution normal signal.

GB 2442745 describes how a number of pulse pairs, each generating a different carrier frequency, can be simultaneously used to interrogate a DAS system. In this document, the purpose of the multiple carriers is to provide redundancy to mitigate the problem of coherence fading caused the amplitude of one carrier to becoming too low to demodulate.

It is still possible to transmit sets of pulses pairs with different frequencies to overcome the problem of coherence fading in embodiments of the present invention. For example using values of f1=−5 MHz, f2=15 MHz and then f1=−10 MHz, f2=20 MHz would give C1=50 and then 60 MHz respectively, with all other frequencies remaining at 30 MHz or less. On photodetector 114, normal signals with carriers of 10, 20 and 30 MHz would be produced for the three sets of input pulses.

In one proposed embodiment, the delay between the two pulses will be approximately 125 ns. The amplitude of the derivative signal is proportional to separation between the two pulses and with this relatively small delay the derivative signal in some applications may have quite a low SNR when the normal signal overloads, especially if the frequency of the disturbance is low. The amplitude of the derivative signal could be improved by increasing the pulse separation however this would have an adverse effect on the spatial resolution of the system.

Figure 2:
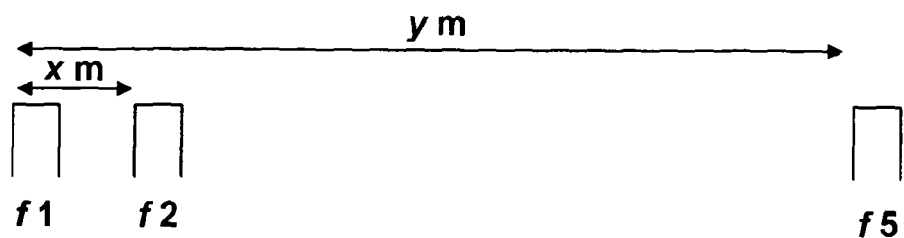
FIG. 2 illustrates an alternative pulse arrangement

A proposed method to avoid this problem would be to transmit a series of three pulses as shown in the embodiment of FIG. 2.

Input pulses f1 and f2 would again have a spacing of x m and mix on photodetector 114 to form the normal signal for a section of fibre of length x/2 m. Input pulses f1 and newly introduced pulse f5 would have a much greater separation of y m and after passing through the output interferometer (now with a delay coil of y m) pulse f5 would mix with pulse f1 on photodetector 112 to give a derivative signal based on a time separation of yn/c, where n is the refractive index of the fibre and c is the speed of light.

Figure 3:
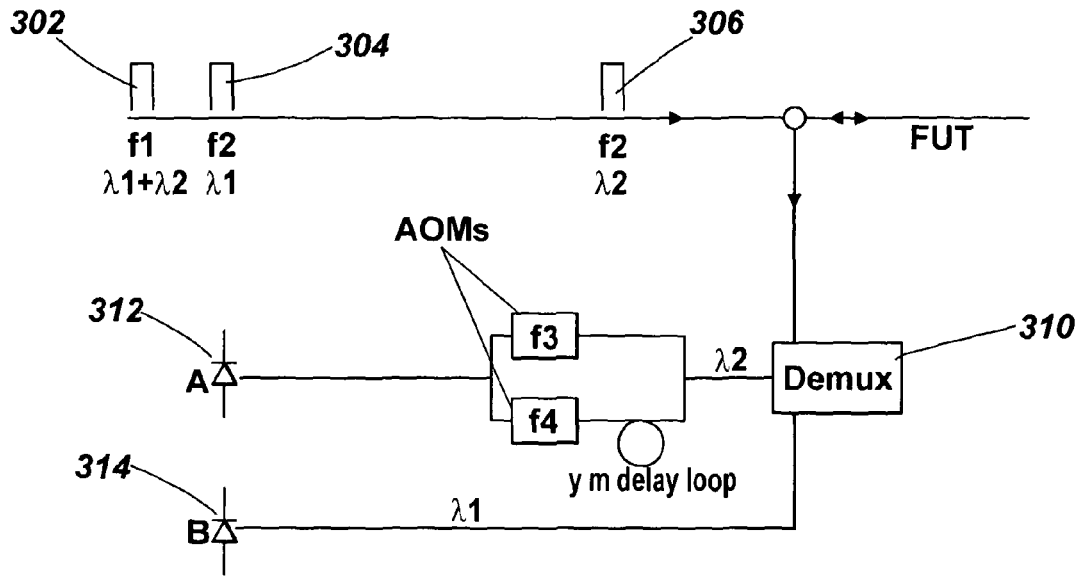
FIG. 3 shows an alternative embodiment of the invention
Figure 4:
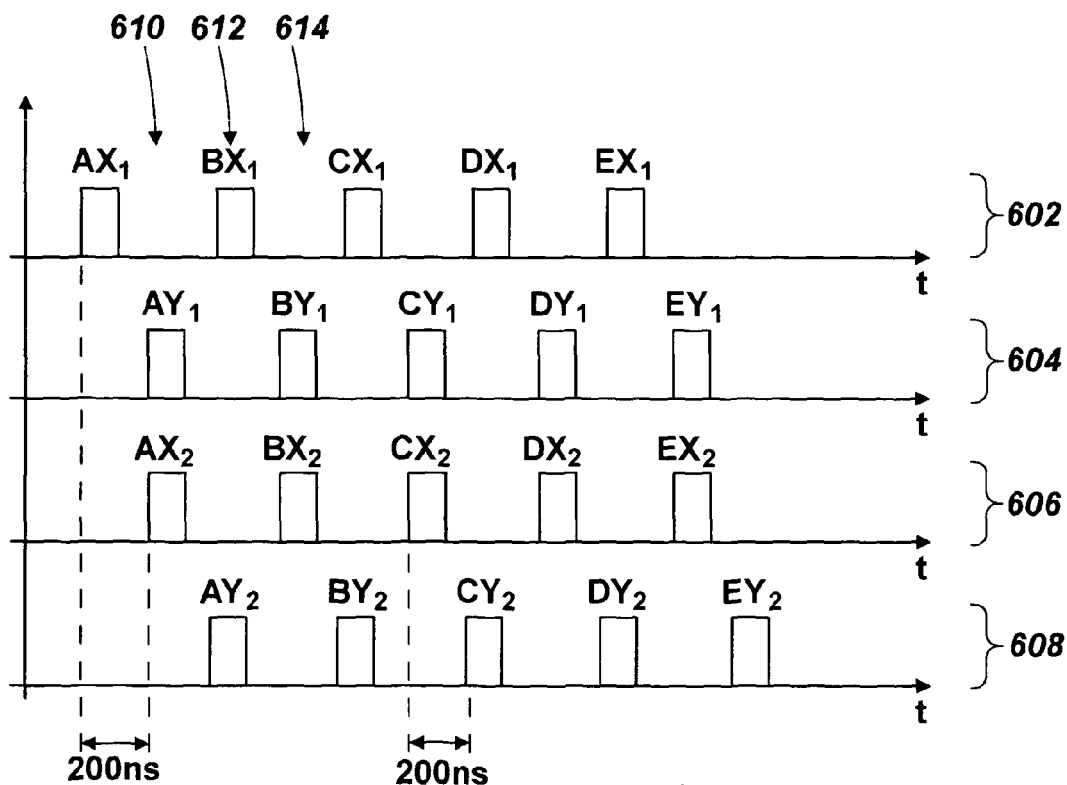
FIG. 4 illustrates the pulsed output of a prior art technique

As each of these pulses should preferably be a different frequency it increases the number of carrier frequencies that are generated making it more difficult to find a set of frequencies that produce the desired signals on carriers well separated from any other. Alternatively the system could generate pulse pairs at two different wavelengths using the arrangement shown in FIG. 3. Wavelength 2 (input pulses 302 and 306) would have a large pulse separation to produce the derivative signals while wavelength 1 (input pulses 302 and 304) had a shorter one to produce the normal signals. On the receive side the wavelengths would be separated by a wavelength demultiplexer 310 with λ2 passing though the output interferometer to photodetector 312 and λ1 passing directly to photodetector 314. The same pair of frequency shifts (f1 and f2) could be used for the two wavelengths.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of distributed acoustic sensing (DAS) by interrogating a length of optic fibre, said optic fibre providing a change in phase of signal propagation in response to a sensed parameter, said method comprising:
   introducing an input signal into a length of optic fibre;
   receiving a return signal backscattered from said optical fibre in response to said input signal;
   comparing a first return signal backscattered from a portion of said fibre at a first time, and a second return signal backscattered from the same portion of said fibre at a second, different time; and
   deriving from said comparison a measure of the rate of change of phase with time of said backscattered signal.

2. A method according to claim 1, wherein said first return signal is frequency shifted relative to said second return signal.

3. A method according to claim 2, wherein the first return signal is modulated by a first frequency shift, and the said second return signal is modulated by a second frequency shift.

4. A method according to claim 1, wherein said method comprises passing received return signals through an output interferometer, said output interferometer arranged to modulate the signal in each arm by a different frequency shift.

5. A method according to claim 1, wherein said input signal comprises a pair of temporally spaced pulses.

6. A method according to claim 5, wherein said pulses have different frequency shifts.

7. A method according to claim 1, further comprising obtaining a value of phase based on said measured rate of change of phase.

8. A method according to claim 1, further comprising comparing a first return signal backscattered from a first portion of said fibre at a first time, and a second return signal backscattered from a second different portion of said fibre at substantially the same time; and deriving from said comparison a measure of phase of said backscattered signal.

9. A method according to claim 8, wherein said measure of phase and said measure of rate of change of phase are determined substantially simultaneously in response to a common input signal.

10. A method according to claim 1, wherein said input signal comprises three temporally spaced pulses.

11. A method according to claim 10, wherein said input pulses include at least two different wavelengths.

12. A method according to claim 10, wherein the temporal spacing between said first and third pulses is greater than twice the temporal spacing between the first and second pulses.

13. A distributed acoustic sensing (DAS) system for interrogating a length of optic fibre, said optic fibre providing a change in phase of signal propagation in response to a sensed parameter, said system comprising:
   a receiver for receiving a signal backscattered from said optic fibre in response to an input signal,
   an output interferometer adapted to combine a first received signal backscattered from a portion of said fibre at a first time, and a second received signal backscattered from the same portion of said fibre at a second, different time, wherein said output interferometer includes a frequency modulator on at least one arm to impose a frequency difference between said first and second return signals; and
   a phase detector for receiving said combined signals and determining the rate of change of phase with time of said backscattered signal.

14. A system according to claim 13, wherein said output interferometer includes a frequency modulator on each arm of said output interferometer, each frequency modulator imposing a different frequency shift.

15. A system according to claim 13, wherein said system includes a second phase detector for determining the phase of said backscattered signal.

16. A system according to claim 13, wherein said system includes a demultiplexer for separating signals backscattered from inputs having different wavelengths.

17. A system according to claim 16, wherein backscattered signals at a first wavelength are passed to said output interferometer, and signals at a second wavelength are passed directly to said second phase detector.

* * * * *